(12) United States Patent
Tanaka

(10) Patent No.: US 12,512,525 B2
(45) Date of Patent: Dec. 30, 2025

(54) CONTROL APPARATUS AND CONTROL METHOD

(71) Applicant: SONY GROUP CORPORATION, Tokyo (JP)

(72) Inventor: Go Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 498 days.

(21) Appl. No.: 17/917,092

(22) PCT Filed: Apr. 16, 2020

(86) PCT No.: PCT/JP2020/016778
§ 371 (c)(1),
(2) Date: Oct. 5, 2022

(87) PCT Pub. No.: WO2021/210143
PCT Pub. Date: Oct. 21, 2021

(65) Prior Publication Data
US 2023/0155192 A1    May 18, 2023

(51) Int. Cl.
*H01M 10/48* (2006.01)
*H01M 10/44* (2006.01)

(52) U.S. Cl.
CPC .......... *H01M 10/48* (2013.01); *H01M 10/44* (2013.01)

(58) Field of Classification Search
CPC .... H01M 10/48; H01M 10/44; H01M 10/052; H01M 10/425; Y02E 60/10; H02J 7/00
See application file for complete search history.

(56) References Cited

U.S. PATENT DOCUMENTS

| | | | | |
|---|---|---|---|---|
| 5,672,951 A | * | 9/1997 | Shiota | H02J 7/00714 320/132 |
| 2008/0297116 A1 | * | 12/2008 | Odaohhara | H01M 10/48 340/815.4 |
| 2017/0018819 A1 | * | 1/2017 | Toya | H01M 10/615 |
| 2017/0271629 A1 | * | 9/2017 | Hori | B32B 15/06 |
| 2019/0207398 A1 | * | 7/2019 | Shih | B60L 53/53 |

FOREIGN PATENT DOCUMENTS

| | | | |
|---|---|---|---|
| JP | 10-287191 A | | 10/1998 |
| JP | 2008-091085 A | | 4/2008 |
| JP | 2008-300038 A | | 12/2008 |
| JP | 2012-150991 A | | 8/2012 |
| JP | 2015-047917 A | | 3/2015 |
| JP | 2015-216729 A | | 12/2015 |
| KR | 20180073764 A | * | 7/2018 |

OTHER PUBLICATIONS

International Search Report and Written Opinion of PCT Application No. PCT/JP2020/016778, issued on Jun. 2, 2020, 10 pages of ISRWO.

* cited by examiner

*Primary Examiner* — Douglas Kay
(74) *Attorney, Agent, or Firm* — CHIP LAW GROUP

(57) ABSTRACT

Provided is a control apparatus that includes a detection unit that detects an impact on a secondary battery or a covering portion to which the secondary battery is fixed, and a control unit that controls a setting related to at least one of charging and discharging of the secondary battery based on one or more of a strength of the detected impact, a direction of the impact, and the number of times of the impact.

6 Claims, 7 Drawing Sheets

| LEVEL CORRECTION VALUE ACCORDING TO IMPACT | | NUMBER | | | | | | | |
|---|---|---|---|---|---|---|---|---|---|
| | | 1 | 2 | 3 | 4 | 5 | 6 | 7 | 8 |
| STRENGTH | G> α | +2 | +4 | +6 | +8 | +8 | +8 | +8 | +8 |
| | α >G> β | +1 | +2 | +3 | +4 | +5 | +6 | +7 | +8 |
| | β >G | +0 | +0 | +1 | +1 | +1 | +2 | +2 | +2 |

| LEVEL CORRECTION VALUE ACCORDING TO IMPACT | | NUMBER | | | | | | | |
|---|---|---|---|---|---|---|---|---|---|
| | | 1 | 2 | 3 | 4 | 5 | 6 | 7 | 8 |
| STRENGTH | G> α | +2 | +4 | +6 | +8 | +8 | +8 | +8 | +8 |
| | α >G> β | +1 | +2 | +3 | +4 | +5 | +6 | +7 | +8 |
| | β >G | +0 | +0 | +1 | +1 | +1 | +2 | +2 | +2 |

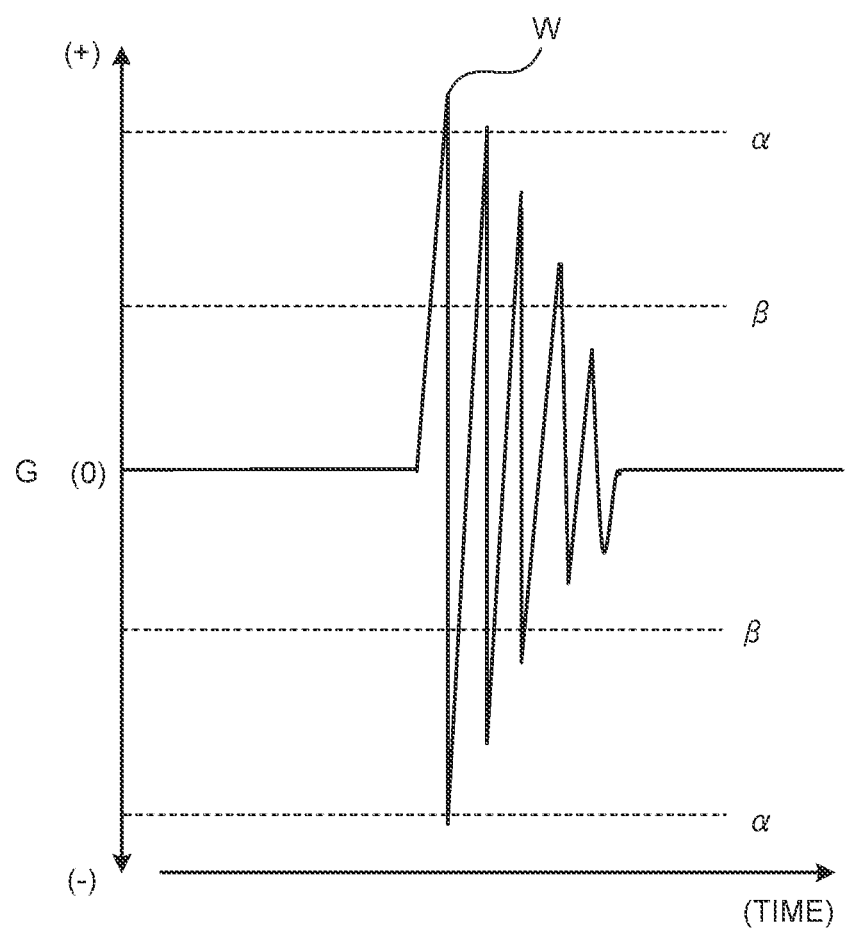

CONTROL APPARATUS AND CONTROL METHOD

CROSS REFERENCE TO RELATED APPLICATIONS

This application is a U.S. National Phase of International Patent Application No. PCT/JP2020/016778 filed on Apr. 16, 2020. Each of the above-referenced applications is hereby incorporated herein by reference in its entirety.

FIELD

The present invention relates to a control apparatus, a control method, and a program.

BACKGROUND

As a battery that supplies power for operating a device, a secondary battery that can be repeatedly charged and discharged is known (for example, Patent Literature 1).

CITATION LIST

Patent Literature

Patent Literature 1: JP 2012-150991 A

SUMMARY

Technical Problem

The secondary battery may receive an impact from the outside. This may occur due to, for example, a case where a device on which the secondary battery is mounted falls and collides with the ground or a floor surface, or a case where an operator accidentally drops the secondary battery removed from a device in which the secondary battery is used for work such as charging. It is necessary to cope with such an impact in order to more safely operate the secondary battery in which charging and discharging are repeated.

An object of the present disclosure is to provide a control apparatus, a control method, and a program capable of coping with an impact on a secondary battery.

Solution to Problem

To solve the problems described above, a control apparatus according to the present disclosure include: a detection unit that detects an impact on a secondary battery or a covering portion to which the secondary battery is fixed; and a control unit that controls a setting related to at least one of charging and discharging of the secondary battery based on one or more of a strength of the detected impact, a direction of the impact, and a number of times of the impact.

BRIEF DESCRIPTION OF DRAWINGS

FIG. 11 is a waveform diagram illustrating an example of an output signal of a detection unit at a time including a moment at which the impact is detected.

DESCRIPTION OF EMBODIMENTS

Hereinafter, an embodiment of the present disclosure will be described in detail with reference to the drawings. Note that the same portions are denoted by the same reference signs in the following embodiment, and a repetitive description thereof will be omitted.

Embodiment

Figures 1, 2:
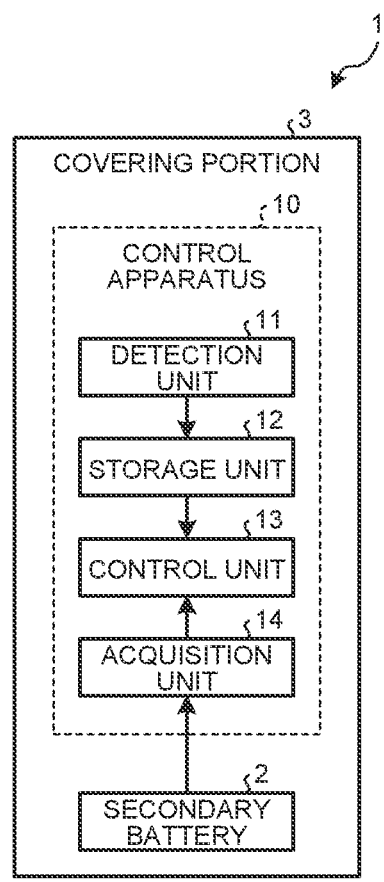
FIG. 1 is a block diagram illustrating a main configuration example of a device to which a control apparatus according to an embodiment is applied.
FIG. 2 is a table illustrating an example of a relationship among a strength of an impact detected by a detection unit, the number of the impacts detected by the detection unit, and an addition value with respect to a value of a level.

FIG. 1 is a block diagram illustrating a main configuration example of a device 1 to which a control apparatus 10 according to an embodiment is applied. The device 1 includes a secondary battery 2, a covering portion 3, and a control apparatus 10.

The secondary battery 2 is a battery provided so as to be chargeable and dischargeable. Specifically, the secondary battery 2 is, for example, a lithium ion secondary battery or a lithium ion polymer secondary battery, but is not limited thereto. The secondary battery 2 may be a nickel-hydrogen storage battery, a nickel-cadmium storage battery, or other secondary batteries which are chargeable and dischargeable.

The covering portion 3 covers the secondary battery 2. Specifically, the covering portion 3 is, for example, a housing of the device 1 including the secondary battery 2 and the control apparatus 10, but is not limited thereto. The covering portion 3 may be another structure body such as a sheet-like covering member wound so as to wrap the secondary battery 2 inside, for example, like an exterior member 25 to be described later. The secondary battery 2 and the control apparatus 10 are fixed to the covering portion 3 illustrated in FIG. 1.

The control apparatus 10 performs control related to at least one of charging and discharging of the secondary battery 2. The control apparatus 10 includes a detection unit 11, a storage unit 12, a control unit 13, and an acquisition unit 14.

The detection unit 11 detects an impact on the secondary battery 2 or the covering portion 3 to which the secondary battery 2 is fixed. Specifically, the detection unit 11 is, for example, an acceleration sensor, but is not limited thereto.

The detection unit 11 may be a sensor that detects the impact using a giant magneto resistive (GMR) effect.

Since the secondary battery 2 is fixed to the covering portion 3 in the example illustrated in FIG. 1, the external impact on the device 1 is transmitted to the secondary battery 2 via the covering portion 3. Since the control apparatus 10 including the detection unit 11 is fixed to the covering portion 3 similarly to the secondary battery 2, the detection unit 11 detects the impact on the covering portion 3. However, the impact on the covering portion 3 is also transmitted to the secondary battery 2 fixed to the covering portion 3 and the control apparatus 10, and thus, the detection unit 11 detects the impact transmitted to the secondary battery 2 by detecting the impact on the covering portion 3.

The storage unit 12 holds data regarding the impact detected by the detection unit 11. Specifically, the storage unit 12 is, for example, a rewritable non-volatile semiconductor memory such as a so-called flash memory, but may be a storage circuit, a storage device, or a recording medium having a similar function.

In the embodiment, when the detection unit 11 detects an impact, data regarding the detected impact is additionally written in the storage unit 12. The storage unit 12 cumulatively records and holds the data regarding the impact detected by the detection unit 11. Therefore, the storage unit 12 holds data that functions as a detection history of the impacts on the covering portion 3 occurring in the past.

In the embodiment, the data held by the storage unit 12 is used to determine a level to be applied to a setting of the secondary battery 2. Hereinafter, the term "held data" refers to the data held by the storage unit 12. Further, the term "level" simply refers to the level applied to the setting of the secondary battery 2.

FIG. 2 is a table illustrating an example of a relationship among the strength of an impact detected by the detection unit 11, the number of the impacts detected by the detection unit 11, and an addition value with respect to a value of the level. Hereinafter, the term "addition value" refers to an addition value with respect to a value of the level.

The strength of the impact is determined based on a predetermined threshold. In the example illustrated in FIG. 2 and FIG. 11 to be described later, a relationship between an impact G detected by the detection unit 11 and thresholds α and β related to the determination of the strength of the impact G is illustrated. In the example illustrated in FIG. 2, it is indicated that an impact G smaller than the threshold β is the relatively weakest impact G, an impact G exceeding the threshold α is the relatively strongest impact G, and an impact G equal to or larger than the threshold β and equal to or smaller than the threshold α is the intermediate impact G between the both.

Further, in the embodiment, the held data is managed in a format in which a total number of impacts individually detected by the detection unit 11 for each impact strength distinguished by the thresholds can be specified. In the case of the example illustrated in FIG. 2, the held data is managed in a format in which the number of times of occurrence of each of the impact G smaller than the threshold β, the impact G equal to or larger than the threshold β and equal to or smaller than the threshold α, and the impact G exceeding the threshold α can be individually specified.

First, a relationship between the impact G smaller than the threshold β and a value of the level will be described. In the example illustrated in FIG. 2, the addition value is +0 at a time point when the impact G smaller than the threshold β is detected one to two times in total. That is, at a time point when only the impact G smaller than the threshold β is detected one to two times in total, the value of the level does not change. On the other hand, at a time point when the impact G smaller than the threshold β is detected three to five times in total, the addition value caused by the impact G smaller than the threshold β is +1. It can also be said that the "number of times of detection of the impact G smaller than the threshold β" as a threshold for the change of the addition value from +0 to +1 is three. Further, at a time point when the impact G smaller than the threshold β is detected six to eight times in total, the addition value caused by the impact G smaller than the threshold β is +2. It can also be said that the "number of times of detection of the impact G smaller than the threshold β" as a threshold for the change of the addition value from +1 to +2 is six.

Next, a relationship between the impact G equal to or larger than the threshold β and equal to or smaller than the threshold α and a value of the level will be described. In the example illustrated in FIG. 2, the addition value increases by +1 every time the impact G equal to or larger than the threshold β and equal to or smaller than the threshold α is detected once. That is, the number of times (m) the impact G equal to or larger than the threshold β and equal to or smaller than the threshold α is detected is the addition value (+m) caused by the impact G equal to or larger than the threshold β and equal to or smaller than the threshold α.

Next, a relationship between the impact G exceeding the threshold α and a value of the level will be described. In the example illustrated in FIG. 2, the addition value increases by +2 every time the impact G exceeding the threshold α is detected once. That is, a value obtained by doubling the number (n) of times of detection of the impact G exceeding the threshold α is the addition value $\{+(2 \times n)\}$ caused by the impact G exceeding the threshold α.

An initial value of the level is set before the detection of the impact by the detection unit 11 is started. Hereinafter, the term "initial value" refers to the initial value of the level. The initial value is zero in the embodiment.

In the embodiment, the addition value managed for each impact strength is added to the initial value in relation to the determination of the value of the level. For example, assumed is a case where the held data stores that the impact G smaller than the threshold β is detected three times, the impact G equal to or larger than the threshold β and equal to or smaller than the threshold α is detected once, and the impact G exceeding the threshold α is detected once. In this case, according to FIG. 2, the addition value caused by the impact G smaller than the threshold β is +1, the addition value caused by the impact G equal to or larger than the threshold β and equal to or smaller than the threshold α is +1, and the addition value caused by the impact G exceeding the threshold α is +2. Therefore, in this case, the value of the level based on all the impacts detected by the detection unit 11 is 4 (=0 +1+1+2).

Note that the initial value and the addition value are not limited to these examples, and can be appropriately changed within a range in which the level can be determined based on the similar concept. Further, the addition value is +0 when the number of times of detection is zero regardless of the strength of the impact G although not illustrated in FIG. 2.

The control unit 13 controls a setting related to at least one of charging and discharging of secondary battery 2 based on one or more of the strength of the impact detected by the detection unit 11, a direction of the impact, and the number of the impacts. Specifically, the control unit 13 performs the control by referring to data held in the storage unit 12.

Hereinafter, the control by the control unit 13 will be described with reference to FIG. 3.

Figures 3, 4:
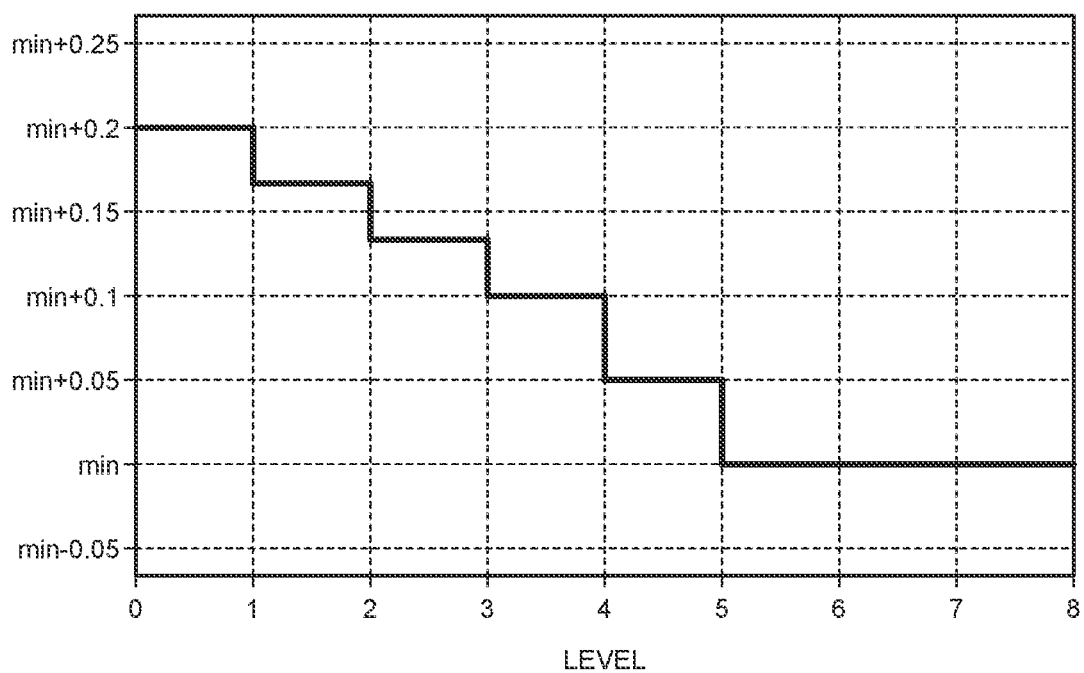
FIG. 3 is a graph illustrating an example of a relationship between a value of the level and a setting related to a secondary battery.
FIG. 4 is a table showing an example of a relationship among a direction of the impact detected by the detection unit, information regarding a usage history of the secondary battery, and a table of an addition value adopted in calculating a value of the level.

FIG. 3 is a graph illustrating an example of a relationship between a value of the level and a setting related to the secondary battery 2. In the graph of FIG. 3, the horizontal-axis direction represents the value of the level, and the vertical-axis direction represents the setting related to the secondary battery 2. When a new impact is detected by the detection unit 11, the control unit 13 refers to the latest held data recorded due to the new impact, and calculates a value of the level by the method described with reference to FIG. 2. The control unit 13 determines a setting to be applied to the secondary battery 2 according to the calculated value of the level. Further, in a case where there is no held data, that is, in a case where the detection unit 11 has never detected an impact, the control unit 13 determines a setting to be applied to the secondary battery 2 assuming that the value of the level is the initial value.

Charge Setting Change

In the embodiment, the control unit 13 performs a charge setting change for decreasing a charge voltage of the secondary battery 2 as control of a setting related to charging of the secondary battery 2. Specifically, the vertical axis in FIG. 3 in the embodiment represents a charge voltage value ([V]) of the secondary battery 2.

In the example illustrated in FIG. 3, the charge voltage value when a value of the level is zero is min +0.2 [V]. That is, in the case where the detection unit 11 has never detected an impact, the control unit 13 sets min +0.2 [V] as the charge voltage value of the secondary battery 2. In the example illustrated in FIG. 3, min +0.2 [V] functions as an initial voltage value related to the charge voltage of the secondary battery 2. Hereinafter, the term "initial voltage value" refers to the initial voltage value related to the charge voltage of the secondary battery 2.

On the other hand, after the detection unit 11 detects such an impact that the value of the level becomes one or more, the control unit 13 decreases the charge voltage of the secondary battery 2 below the initial voltage value. In the example illustrated in FIG. 3, in the case where the value of the level is three, min +0.1 [V] is set as the charge voltage value of the secondary battery 2. Further, as the value of the level increases to zero, one, two, and three, the charge voltage value of the secondary battery 2 is decreased stepwise by 0.1/3 [V] (=0.0333 . . . [V]) from min +0.2 [V] to min +0.1 [V]. Further, when the value of the level is five or more, min [V] is set as the charge voltage value of the secondary battery 2. Further, as the value of the level increases to four and five, the charge voltage value of the secondary battery 2 is decreased stepwise by 0.1/2 [V] (=0.05 [V]) from min +0.1 [V] toward min [V]. In this manner, the control unit 13 decreases the charge voltage of the secondary battery 2 stepwise in accordance with the value of the level.

Note that the charge voltage value of the secondary battery 2 becomes min at a time point when the value of the level becomes five, and the charge voltage value of the secondary battery 2 does not become smaller than min even if the value of the level exceeds five in the example illustrated in FIG. 3, but the present invention is not limited thereto, and the charge voltage value of the secondary battery 2 may be further decreased from the time point when the value of the level is five if the value of the level becomes equal to or larger than six. However, the charge voltage value of the secondary battery 2 is set to a voltage value exceeding a voltage value at the time of discharging of the secondary battery 2.

More specifically, in a case where the voltage value at the time of discharging of the secondary battery 2 is four [V], the minimum value (min) of the charge voltage is set to a voltage value exceeding four [V], for example, 4.2 [V]. That is, the minimum value (min) of the charge voltage allows the secondary battery 2 to be charged even after the setting is changed by the control unit 13. Further, the initial voltage value is a voltage value exceeding the minimum value (min), such as 4.4 [V]. As a result, the secondary battery 2 can be charged at a higher speed with a higher charge voltage until the impact detection history by the detection unit 11 is generated. Further, the charge voltage value of the secondary battery 2 after detection of an impact by the detection unit 11 is set to a lower voltage value than that before the impact detection by the detection unit 11, it is possible to more safely charge the secondary battery 2 in consideration of the influence of the impact on the secondary battery 2.

Discharge Setting Change

Although the charge setting change has been exemplified above, the control of the setting related to the secondary battery 2 is not limited to the charge setting change. For example, a dischargeable amount corresponding to a physical limit of the secondary battery 2, such as a so-called maximum capacity, may be set as an initial capacity value of the setting related to the secondary battery 2, and the control unit 13 may perform a discharge setting change for decreasing a maximum discharge amount of the secondary battery 2 in response to detection of an impact by the detection unit 11. When the discharge setting change is performed, for example, a value (min +0.2) related to a setting of the secondary battery 2 at a time point of Level 0 in FIG. 3 corresponds to the maximum capacity of the secondary battery 2, and a value related to a setting of the secondary battery 2 at Level 1 or a higher level corresponds to the maximum discharge amount of the secondary battery 2 decreased in response to the detection of the impact by the detection unit 11. Note that the degree of change in the maximum discharge amount of the secondary battery 2 in accordance with an increase in the value of the level is not limited to FIG. 3, and can be appropriately changed according to the design of the secondary battery 2 or the like. Specifically, the control unit 13 may perform control of the setting for decreasing the maximum discharge amount of the secondary battery 2 stepwise by disabling some of a plurality of cells provided in the secondary battery 2.

Control Based on Number of Impacts

The management for each strength described with reference to FIG. 2 can be omitted. In such a case, the addition value is obtained by treating all impacts similarly as, for example, the "impact G smaller than the threshold β", the "impact G equal to or larger than the threshold β and equal to or smaller than the threshold α", or the "impact exceeding the threshold α" in FIG. 2. That is, the control unit 13 may control the setting of the secondary battery 2 based on the number of the impacts. Of course, a relationship between the number of impacts and an addition value different from that regarding the "impact G smaller than the threshold β", the "impact G equal to or larger than the threshold β and equal to or smaller than the threshold α", or the "impact exceeding the threshold α" in FIG. 2 may be applied.

Control Based on Direction of Impact

Further, in a case where an impact in a specific direction is detected, an addition value and a value of the level may be calculated based on the description with reference to FIG. 2, and a set value regarding the secondary battery 2 may be changed as described with reference to FIG. 3. Further, conversely, in a case where an impact in a direction other than the specific direction is detected, such a set value related to the secondary battery 2 may be changed.

Control Based on Information Regarding Usage History of Secondary Battery

Further, one or more of the threshold, the degree of decrease in the charge voltage due to the charge setting change, and the degree of decrease in the maximum discharge amount due to the discharge setting change may correspond to information regarding a usage history of the secondary battery 2. The acquisition unit 14 acquires the information regarding the usage history of the secondary battery 2. The acquisition unit 14 is, for example, a timer that measures an elapsed time from a timing at which the device 1 has been used for the first time. The acquisition unit 14 may be a counter that counts at least one of the number of times of charging and the number of times of discharging with respect to the secondary battery 2.

FIG. 4 is a table showing an example of a relationship among the direction of the impact detected by the detection unit 11, the information regarding the usage history of the secondary battery 2, and a table of the addition value adopted in calculating a value of the level. FIG. 4 illustrates a case where the acquisition unit 14 is the timer, and control applied in units of years (elapsed years) can be changed. Note that, for example, the fact that the elapsed year is one year indicates that the elapsed time from the timing at which the device 1 has been used for the first time is one year (for example, 365 days). When the acquisition unit 14 is the counter that counts at least one of the number of times of charging and the number of times of discharging with respect to the secondary battery 2, the similar concept can be applied by changing the field of the elapsed year to the number of times of charging, the number of times of discharging, or a sum of the number of times of charging and the number of times of discharging.

Note that the example illustrated in FIG. 4 assumes a case where the detection unit 11 is an acceleration sensor capable of detecting accelerations in three directions of an X direction, a Y direction, and a Z direction orthogonal to each other. Further, the acceleration toward one side along one direction is defined as plus (+), and the acceleration toward the other side is defined as minus (−). Some of X+, X−, Y+, Y−, Z+, and Z− illustrated in FIG. 4 may be omitted in accordance with directions of the acceleration detectable by the detection unit 11.

The field "direction" in FIG. 4 corresponds to a direction in which the acceleration was the highest at the time of occurrence of the impact among the directions in which the acceleration can be detected by the detection unit 11. That is, the example illustrated in FIG. 4 illustrates a case where an adopted table (see FIG. 2) of the addition value is changed depending on a direction of the impact specified based on the direction in which the acceleration was the highest at the time of occurrence of the impact. Hereinafter, the term "impact direction" refers to the direction in which the acceleration was the highest at the time of occurrence of the impact. Furthermore, FIG. 4 illustrates a case where the adopted table of the addition value is changed according to the elapsed years.

For example, Table 1 is adopted when the elapsed year is less than one year (or equal to or less than one year) and the impact direction is X+ or X−. In this example, Table 1 is assumed to be the same as the table illustrated in FIG. 2. On the other hand, Table 2 is adopted when the elapsed year is less than one year and the impact direction is Y+ or Y−. In Table 2, the degree of + of the addition value is partially different from that in the table illustrated in FIG. 2. A difference in the degree of + of the addition value according to the impact direction is determined in advance based on a shape of the covering portion 3, a fixed position of the secondary battery 2 with respect to the covering portion 3, a fixing method, and the like. Further, Table 3 is adopted when the elapsed year is less than one year and the impact direction is Z+ or Z−. In Table 3, the degree of + of the addition value is partially different from those in the table illustrated in FIG. 2 and Table 2 described above. In this manner, control of different settings related to the secondary battery 2 according to the impact direction may be adopted.

Further, Table 4 is adopted when the elapsed years are equal to or more than one year and less than two years (or more than one year and equal to or less than two years) and the impact direction is X+ or X−. In Table 4, the addition values are larger in some or all cases than those in Table 1. Further, Table 7 is adopted when the elapsed years are equal to or more than two years and less than three years (or more than two years and equal to or less than three years) and the impact direction is X+ or X−. In Table 7, the addition values are larger in some or all cases than those in Table 4. Further, Table 10 is adopted when the elapsed years are equal to or more than three years and less than four years (or more than three years and equal to or less than four years) and the impact direction is X+ or X−. In Table 10, the addition values are larger in some or all cases than those in Table 7. Further, Table 13 is adopted when the elapsed years are equal to or more than four years and less than five years (or more than four years and equal to or less than five years) and the impact direction is X+ or X−. In Table 13, the addition values are larger in some or all cases than those in Table 10. Further, Table 16 is adopted when the elapsed years are equal to or more than five years (or more than five years) and the impact direction is X+ or X−. In Table 16, the addition values are larger in some or all cases than those in Table 13.

Note that mutual relationships among Tables 2, 5, 8, 11, 14, and 17 when the impact direction is Y+ or Y− and mutual relationships in Tables 3, 6, 9, 12, 15, and 18 when the impact direction is Z+ or Z− are similar to mutual relationships among Tables 1, 4, 7, 10, 13, and 16. In this manner, the settings related to the secondary battery 2 may be controlled such that the addition value is more likely to increase as the degree of the elapsed years (or the number of times of charging or the like) increases.

Note that the adopted table is not changed between the plus (+) and minus (−) in the impact direction in the example illustrated in FIG. 4, but the adopted table may be further changed depending on whether the impact direction is plus (+) or minus (−) for some or all of the directions.

Control Based on Strength of Impact

Further, the setting related to the secondary battery 2 may be decreased to a limit value in safety design such as the minimum value (min) in FIG. 3 at a time point when an impact of a certain strength or more is detected at least once, and thereafter, the limit value may be maintained.

Other Control

A plurality of combinations of the control based on the number of the impacts, the control based on the direction of the impact, the control based on the direction of the impact, and the control based on the strength of the impact can be adopted. For example, the setting related to the secondary battery 2 may be decreased to a limit value in safety design such as the minimum value (min) in FIG. 3 at a time point when an impact having a certain strength or more is detected at least once, and an addition value and a value of the level may be calculated based on the description with reference to FIG. 2 according to the number of the impacts regardless of the degree of a strength of an impact smaller than the certain strength when the impact in a specific direction or a direction other than the specific direction is detected among impacts having strengths smaller than the certain strength to change a set value related to the secondary battery 2 as in the description with reference to FIG. 3.

Further, the control unit 13 may perform both the charge setting change and the discharge setting change. In such a case, one control unit 13 may change both the charge setting and the discharge setting, or the control unit 13 for the charge setting change and the control unit 13 for the discharge setting change may be separately provided. Further, a specific method for calculating the addition value and the level adopted in the charge setting change may be different from a specific method for calculating the addition value and the level adopted in the discharge setting change. More specifically, specific numerical values in the table as illustrated in FIG. 2 and the graph as illustrated in FIG. 3 adopted in the charge setting change may be different from specific numerical values in the table as illustrated in FIG. 2 and the graph as illustrated in FIG. 3 adopted in the discharge setting change. In this manner, the control unit 13 determines the level of the control to be applied based on the comparison result between the predetermined threshold and the value corresponding to one or more of the strength of the impact, the direction of the impact, and the number of the impacts, and performs the control in accordance with the level. Further, the level is determined based on one or more of the strength of the impact, the direction of the impact, and the number of the impacts detected by the detection unit 11 as described with reference to the examples of FIGS. 2 to 4.

Further, in a case where an exterior (cover or the like) capable of alleviating an external impact is further attached to the covering portion 3 or the secondary battery 2 that is not covered with the covering portion 3, control may be performed assuming that the influence of the impact on the secondary battery 2 is reduced as compared with a case where the exterior is not provided, for example, by applying an addition value smaller than the addition value as illustrated in FIG. 2. In this case, the setting that the exterior is attached may be performed by software or hardware. In a case where the setting related to the exterior is performed by software, for example, the setting is input to the control unit 13 via an input interface (a touch panel or the like) of the device 1 which is an electronic device. Further, in a case where the setting related to the exterior is performed by hardware, for example, a shape of the exterior is realized by a method of meshing with a switch for exterior detection provided outside the device 1.

Note that the value related to the setting of the secondary battery 2 at the time point of Level 0 with respect to the minimum value (min) of the value related to the setting of the secondary battery 2 is min +0.2 in the example illustrated in FIG. 3, but the relationship between the minimum value (min) and the value related to the setting of the secondary battery 2 at the time point of Level 0 is not limited thereto, and can be changed as appropriate. Further, the amount of change of the value related to the setting of the secondary battery 2 that is decreased stepwise every time the value of the level is increased by one is different between a range in which the value of the level is zero to three and a range in which the value of the level is three to five in the example illustrated in FIG. 3, but can be appropriately changed without being limited thereto. For example, the degree of increase in the value of the level and the degree of change in the value related to the setting of the secondary battery 2 may have a proportional relationship, or a difference between the values related to the setting of the secondary battery 2 before and after the value of the level is increased by one may be different at each level.

Flowchart

Figure 5:
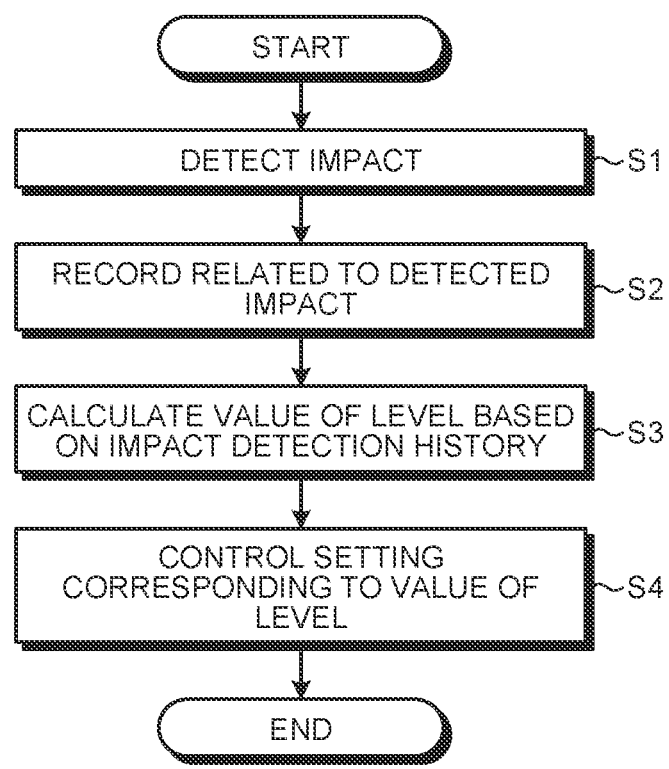
FIG. 5 is a flowchart illustrating an example of a flow of control of the setting related to the secondary battery.

FIG. 5 is a flowchart illustrating an example of a flow of control of the setting related to secondary battery 2. When an impact is detected by the detection unit 11 (Step S1), data regarding the detected impact is recorded in the storage unit 12 (Step S2). Using at least one of the detection of the impact by the processing of Step S1 and the recording of the data regarding the impact by the processing of Step S2 as a processing start trigger, the control unit 13 calculates a value of the level based on an impact detection history indicated by the data recorded in the storage unit 12 (Step S3). The control unit 13 controls the setting related to the secondary battery 2 in accordance with the value of the level calculated in the processing of Step S3 (Step S4). As the processing of Step S4, specifically, the control unit 13 performs, for example, at least one of the above-described charge setting change and discharge setting change.

Specific Form Example

Hereinafter, a more specific form example of the device 1 will be described with reference to FIGS. 6 to 11.

Figure 6:
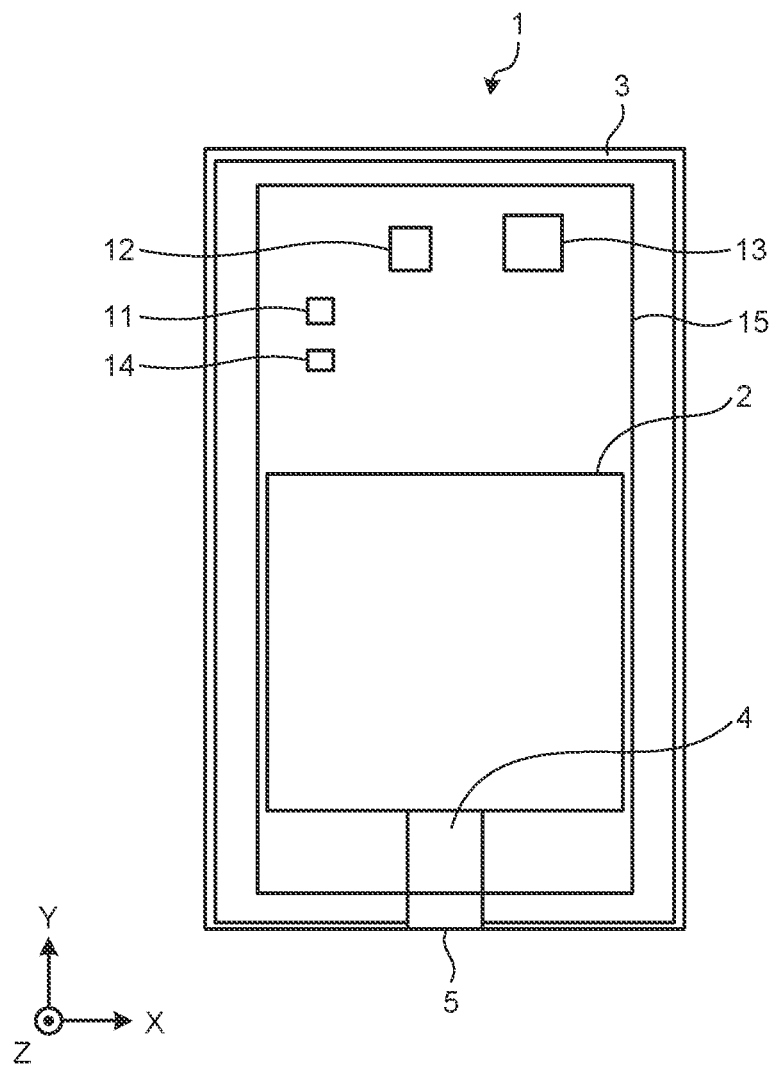
FIG. 6 is a schematic view illustrating a specific form example of the device.

FIG. 6 is a schematic view illustrating a specific form example of the device 1. The device 1 illustrated in FIG. 6 and FIG. 7 to be described later is an electronic device such as a so-called smartphone. The device 1 includes a substrate 15 fixed in the covering portion 3, and a wiring 4 and a terminal 5 connected to the secondary battery 2. In the example illustrated in FIG. 6, the detection unit 11, the storage unit 12, the control unit 13, and the acquisition unit 14 are provided as circuits mounted on the substrate 15. FIG. 6 illustrates a view in which an upper surface of the covering portion 3 is opened for the purpose of illustrating internal configurations of the covering portion 3, but actually, the covering portion 3 has a box shape that includes configurations excluding an external terminal connecting portion of the terminal 5.

The control unit 13 may be a controller that controls the respective units of the device 1. The control unit 13 is realized by a processor such as a central processing unit (CPU) and a micro-processing unit (MPU). For example, the control unit 13 is realized as the processor executes various programs stored in the storage device inside the device 1 or outside the device 1 using a random access memory (RAM)

or the like as a work area. Note that the control unit 13 may be realized by an integrated circuit such as an application-specific integrated circuit (ASIC) and a field-programmable gate arrays (FPGA). All the CPU, MPU, ASIC, and FPGA can be regarded as control units. Further, the control unit 13 may be provided as a power management integrated circuit (PMIC) of the device 1.

Further, the detection unit 11 is, for example, micro electro mechanical systems (MEMS) functioning as an acceleration sensor using a semiconductor system of a piezoresistive type, a gas temperature distribution type, or a capacitance type, but is not limited thereto, and may be a chip type element or the like of a so-called piezoelectric acceleration sensor using a piezoelectric element such as a piezoelectric ceramic. Further, the circuits functioning as the detection unit 11, the storage unit 12, and the acquisition unit 14 may be provided alone as a dedicated package circuit, but may be physically integrated into another configuration as one function of a controller such as the control unit 13.

The secondary battery 2 is connected to the terminal 5 via the wiring 4. Further, the secondary battery 2 is electrically connected to be capable of supplying discharge power to the detection unit 11, the control unit 13, the acquisition unit 14, the storage unit 12, various circuits provided in the device 1 (not illustrated), and a display (not illustrated) provided in the device 1 mounted on the substrate 15. The wiring 4 is a wiring provided on a flexible printed circuit board or a wiring mounted on the substrate 15. The terminal 5 is an interface terminal conforming to a predetermined standard. Examples of the predetermined standard include a universal serial bus (USB), but are not limited thereto, and can be appropriately changed. The charging is performed by power supplied from an external power supply via a cable connected to the terminal 5. The charge voltage value applied at the time of the charging is changed before and after the detection of the impact, for example, by the charge setting change described above.

Figure 7:
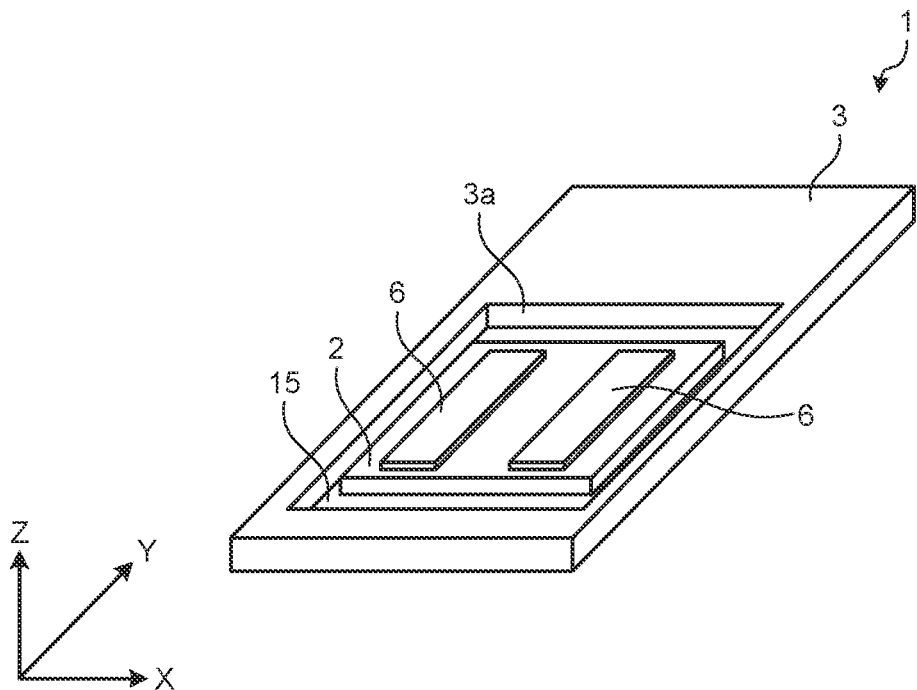
FIG. 7 is a schematic view illustrating an example of a relationship between the secondary battery and a covering portion.

FIG. 7 is a schematic view illustrating an example of a relationship between the secondary battery 2 and the covering portion 3. The secondary battery 2 is arranged so as to be accommodated in a space 3a provided in the covering portion 3. At least a part of an outer peripheral surface of the secondary battery 2 is provided with a fixing unit 6 configured to fix the secondary battery 2 to the covering portion 3. The fixing unit 6 is, for example, a sticky double-sided tape, an adhesive, or the like, but may have any configuration as long as the secondary battery 2 can be fixed to the covering portion 3. As illustrated in FIG. 7, the fixing unit 6 provided to face the opposite side of the substrate 15 in the secondary battery 2 is joined to a lid member of the space 3a (not illustrated). The lid member is provided as one member of the covering portion 3, and closes the space 3a from the outside to accommodate the secondary battery 2 in the covering portion 3.

Note that the X direction, the Y direction, and the Z direction, which are the three directions of the impact in the description with reference to FIG. 4, correspond to three orthogonal sides in the covering portion 3 having a rectangular parallelepiped outer shape as illustrated in FIGS. 6 and 7, for example. Although a direction along the longest side among the three sides is defined as the Y direction, a direction along the shortest side among the three sides is defined as the Z direction, and a direction along the other side among the three sides is defined as the X direction in FIGS. 6 and 7, the present invention is not limited thereto, and any relationship between the covering portion 3 and the three directions of the impact is adopted.

Figure 8:
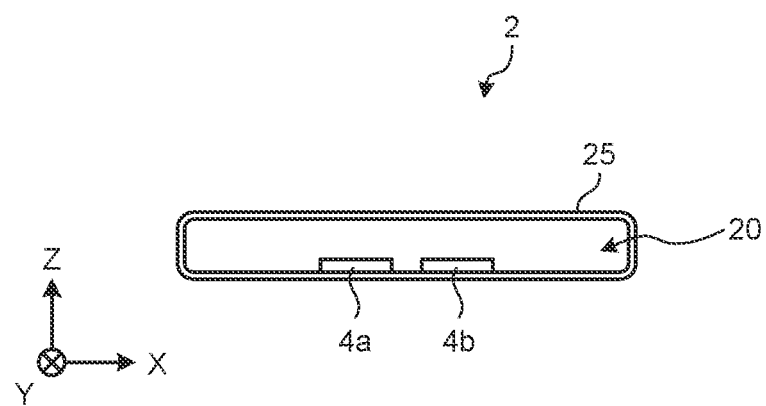
FIG. 8 is a view illustrating a specific configuration example of the secondary battery.

FIG. 8 is a view illustrating a specific configuration example of the secondary battery 2. As illustrated in FIG. 8, the secondary battery 2 includes, for example, a wound element 20, an exterior member 25, and electrodes 4a and 4b. The secondary battery 2 described with reference to FIGS. 8 and 9 is the lithium ion secondary battery.

Figure 9:
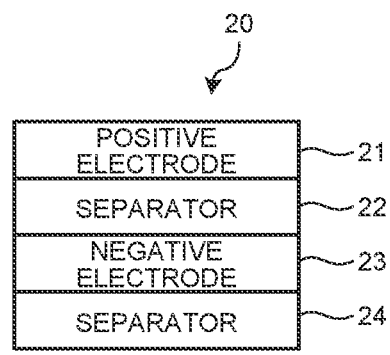
FIG. 9 is a view illustrating a configuration example of a laminated structure body constituting a wound element.

FIG. 9 is a view illustrating a configuration example of a laminated structure body constituting the wound element 20. As illustrated in FIG. 9, the wound element 20 is formed by winding a sheet-like member in which a positive electrode 21, a separator 22, a negative electrode 23, and a separator 24 are laminated. For the positive electrode 21, for example, a cobalt-based lithium compound such as a lithium cobalt oxide is used as a material, but other materials such as manganese, nickel, and an iron phosphate-based lithium compound may be used without being limited thereto. The separators 22 and 24 insulate the positive electrode 21 and the negative electrode 23 from each other. For the separators 22 and 24, for example, a polymer such as polyolefin is used as a material, but other materials such as a nonwoven fabric may be used without being limited thereto. The separators 22 and 24 are provided with minute holes through which lithium ions can pass. For the negative electrode 23, for example, a carbon-based compound such as graphite or hard carbon is used as a material, but other materials such as tin, a silicon-based material, and lithium titanate may be used without being limited thereto.

Further, the wound element 20 includes an electrolyte although not illustrated. The electrolyte is made from, for example, a solvent such as a lithium salt and ethylene carbonate.

The terminal 4a illustrated in FIG. 8 is electrically connected to the positive electrode 21 and extends from the wound element 20. The terminal 4b is electrically connected to the negative electrode 23 and extends from the wound element 20. The terminal 4a and the terminal 4b are connected to the wiring 4, the wiring connecting the secondary battery 2 and the substrate 15, and the like.

The exterior member 25 illustrated in FIG. 8 covers the outer side of the wound element 20. Specifically, the exterior member 25 is a packaging material provided to enclose the wound element 20. The packaging material is, for example, an aluminum laminate film, but is not limited thereto, and the specific material can be appropriately changed.

Figure 10:
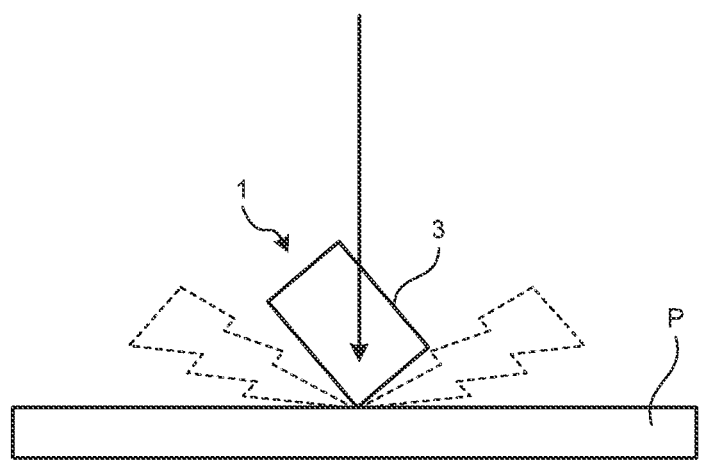
FIG. 10 is a schematic view illustrating an example of a case where the impact is applied to the covering portion from the outside.

FIG. 10 is a schematic view illustrating an example of a case where an impact is applied to the covering portion 3 from the outside. FIG. 10 illustrates the example in which the impact is applied to the covering portion 3 from the outside when the device 1 falls and collides with a floor surface P. In FIG. 10, a state in which the impact occurs is schematically illustrated by a broken line waveform. A situation as illustrated in FIG. 10 may occur due to, for example, a reason that a user holding the device 1 by the hand drops the device 1. Note that a situation where an impact is externally applied to the covering portion 3 is not limited to the example described with reference to FIG. 10. For example, the external impact is applied to the covering portion 3 even in other situations, such as, in a case where a bag-shaped suspended object containing the device 1 is swung around and collides with an external rigid body (a tree, a pillar, furniture, or the like).

FIG. 11 is a waveform diagram illustrating an example of an output signal of the detection unit 11 at a time including a moment at which an impact G is detected. In FIG. 11, the horizontal-axis direction represents a lapse of time, and the vertical-axis direction represents an impact detection direction. The vertical-axis direction represents the direction of the detected impact. The impact direction is, for example, any of the X direction, the Y direction, and the Z direction described with reference to FIG. 4. In the impact direction, the plus (+) and minus (−) face each other across an origin (0) of the output signal of the detection unit 11 in a case where no acceleration is detected.

An output signal W illustrated in FIG. 11 is an example of a case where a plus (+) impact G is detected. Specifically, the output signal W illustrated in FIG. 11 first swings from the origin (0) to the plus (+) at the moment when the impact G is detected, then swings to the minus (−), and alternately swings to the plus (+) and minus (−) while reducing a swing width with respect to the origin (0) to converge to the origin (0) as the time elapses. Note that, in a case where a negative (−) impact G is detected, the output signal W first swings from the origin (0) to the negative (−) at the moment when the impact G is detected. The detection unit 11 is provided to be capable of detecting the direction and orientation of the impact G in this manner. Further, the detection unit 11 can detect a strength of the impact by a maximum swing width with respect to the origin (0) at the moment when the impact G is detected. The detection unit 11 is provided to be capable of detecting the impact based on the output signal W generated in response to the occurrence of the impact G in this manner.

Further, when the predetermined thresholds such as the thresholds α and β are used as thresholds for a variation amount of output with respect to the origin (0) as illustrated in FIG. 11, the strength of the impact G can be classified as described with reference to FIG. 2. Note that the number of the predetermined thresholds is not limited to two, such as the thresholds α and β, and may be one or three or more. The number of predetermined thresholds corresponds to the number of classifications of the strength of the impact G.

As described above, according to the embodiment, provided are the detection unit 11 that detects the impact on the secondary battery 2 or the covering portion 3 to which the secondary battery 2 is fixed, and the control unit 13 that controls the setting related to at least one of charging and discharging of the secondary battery 2 based on one or more of the strength of the detected impact, the direction of the impact, and the number of the impacts. As a result, the impact on the secondary battery 2 or the covering portion 3 to which the secondary battery 2 is fixed is detected, and at least one of charging and discharging of the secondary battery 2 can be performed under the setting related to the secondary battery 2 controlled in response to the detected impact. Therefore, it is possible to cope with the impact on the secondary battery.

Further, the control unit 13 determines a level of control to be applied based on a comparison result between a value corresponding to the one or more of the strength of the impact, the direction of the impact, and the number of the impacts and the predetermined thresholds, and performs at least one of the charge setting change for decreasing the charge voltage of the secondary battery 2 and the discharge setting change for decreasing the maximum discharge amount of the secondary battery 2 in accordance with the level. The secondary battery 2 can be charged more safely by decreasing the charge voltage, and it is possible to suppress a risk during the charging when the secondary battery 2 is damaged by the impact by any chance. Further, the secondary battery 2 can be discharged more safely by decreasing the maximum discharge amount, and it is possible to suppress a risk during the discharging when the secondary battery 2 is damaged by the impact by any chance.

Further, the control unit 13 decreases the charge voltage of the secondary battery 2 stepwise in accordance with the level in the charge setting change. Therefore, it is possible to more finely control the charge voltage of the secondary battery 2 in accordance with the level determined based on the detected impact.

Further, the control unit 13 decreases the maximum discharge amount of the secondary battery 2 stepwise in accordance with the level in the discharge setting change. Therefore, it is possible to more finely control the maximum discharge amount of the secondary battery 2 in accordance with the level determined based on the detected impact.

Further, the device 1 includes the acquisition unit 14 that acquires information regarding the usage history of the secondary battery 2, and one or more of the degree of decrease in the charge voltage due to the charge setting change and the degree of decrease in the maximum discharge amount due to the discharge setting change correspond to the information. As a result, it is possible to control the charge voltage of the secondary battery 2 and the maximum discharge amount of the secondary battery 2 according to the information regarding the usage history of the secondary battery 2 such as the elapsed years and the number of times of charging and discharging. Therefore, it is possible to reflect safer control of the setting of the secondary battery 2 in consideration of the usage history of the secondary battery 2.

Further, the secondary battery 2 is the lithium ion secondary battery or the lithium ion polymer secondary battery. Therefore, the lithium ion secondary battery or the lithium ion polymer secondary battery can be operated under the setting controlled in response to the detected impact.

In particular, in the case where the secondary battery 2 is the lithium ion secondary battery or the lithium ion polymer secondary battery, when an external impact occurs, a force of the impact may act to peel off the separators 22 and 24 insulating the positive electrode 21 and the negative electrode 23 from the positive electrode 21 and the negative electrode 23. As a result, when the insulation between the positive electrode 21 and the negative electrode 23 by the separator 22 becomes incomplete, the positive electrode 21 and the negative electrode 23 are short-circuited. Further, when an external impact occurs, a force of the impact may act to peel off a part of the exterior member 25 from the wound element 20. Continuing the operation that is completely the same as that before the impact is applied even though the impact force acts as described above may cause a possibility of accelerating deterioration of the secondary battery 2, a possibility of degrading a function of the secondary battery 2 as a power source, and the like. Therefore, when the setting of the secondary battery 2 is controlled as described above, the damage to the function of the secondary battery 2 can be further suppressed, and the secondary battery 2 can be continuously used more safely.

Further, in the case where the secondary battery 2 is the lithium ion secondary battery or the lithium ion polymer secondary battery, it is experientially known that deterioration such as expansion occurs due to repeated charging and discharging. Continuing the operation without considering such deterioration and the influence of the impact as described above may cause the possibility of accelerating the deterioration of the secondary battery 2, the possibility of degrading the function of the secondary battery 2 as the power source, and the like. Therefore, when the setting of the secondary battery 2 is controlled as described above, the damage to the function of the secondary battery 2 can be further suppressed, and the secondary battery 2 can be continuously used more safely.

Other Specific Form Examples

Note that the device 1 is not limited to the electronic device such as a smartphone. The device 1 may have a configuration such as an unmanned aerial vehicle such as a so-called drone, and an aircraft using the technology of the unmanned aerial vehicle. Further, the device 1 may be also configured such that an electric motor serves for part or whole of motive power as in a so-called electric vehicle or an assist bicycle. When the device 1 has these configurations, the secondary battery 2 supplies power to be used for the operation of a relevant configuration. Further, the device 1 may be a battery pack detachably provided with respect to the relevant configuration instead of the relevant configuration itself. When the device 1 is the battery pack, the device 1 may be provided in a form in which the secondary battery 2 and the control apparatus 10 are integrally packaged in the covering portion 3, or may be configured such that the control apparatus 10 is provided in the relevant configuration and the secondary battery 2 is detachably provided with respect to the relevant configuration.

Other Modifications

A control apparatus that controls the device 1 or the control apparatus 10 of the present embodiment may be realized by a dedicated computer system or a general-purpose computer system.

For example, a program used for executing the above operations is stored and delivered in a computer-readable recording medium such as an optical disk, a semiconductor memory, a magnetic tape, and a flexible disk. Then, for example, the control apparatus is configured by installing the program in a computer and executing the above-described processing. At this time, the control apparatus may be an apparatus (for example, a personal computer) outside the device 1 or the control apparatus 10. Further, the control apparatus may be an imaging device 1 or a device (for example, the control unit 13) inside a distance measuring device 10.

Further, the above-described communication program can be stored in a disk device provided in a server device on a network such as the Internet in such a way to be downloaded to a computer. Further, the above-described functions can be realized by cooperation between an operating system (OS) and application software. In this case, other parts than OS can be stored in a medium for delivery, or other parts than OS can be stored in the server device and downloaded to a computer.

Further, among each process described in the above embodiment, all or a part of the processes described as being performed automatically may be manually performed or the processes described as being performed manually can be performed automatically by the known method. In addition, the processing procedures, specific names, and information including various data and parameters illustrated in the above documents and drawings can be arbitrarily changed unless otherwise specified. For example, various types of information illustrated in each drawing are not limited to the illustrated information.

Further, each component of each apparatus illustrated is a functional concept, and does not necessarily need to be physically configured as illustrated. That is, the specific form of distribution/integration of each apparatus is not limited to those illustrated in the drawings, and all or a part thereof may be functionally or physically distributed/integrated into arbitrary units according to various loads and usage conditions.

Further, the above-described embodiment can be appropriately combined within a range that does not contradict processing contents. Further, the order of the steps illustrated in the flowchart of the above-described embodiment can be changed as appropriate.

Further, for example, the present embodiment can be also implemented as any configuration that constitutes an apparatus, for example, a processor as system large scale integration (LSI), a module using a plurality of processors, a unit using a plurality of modules, a set obtained by adding other functions to the unit (that is, a partial configuration of an apparatus), or the like.

Note that the effects described in the present specification are merely examples and are not restrictive of the disclosure herein, and other effects not described herein also can be achieved.

Note that the present technology can also have the following configurations.

(1)

A control apparatus including:

a detection unit that detects an impact on a secondary battery or a covering portion to which the secondary battery is fixed; and a control unit that controls a setting related to at least one of charging and discharging of the secondary battery based on one or more of a strength of the detected impact, a direction of the impact, and a number of times of the impact.

(2)

The control apparatus according to (1), wherein the control unit determines a level of control to be applied based on a comparison result between a predetermined threshold and a value corresponding to the one or more of the strength of the impact, the direction of the impact, and the number of times of the impact, and performs at least one of a charge setting change for decreasing a charge voltage of the secondary battery and a discharge setting change for decreasing a maximum discharge amount of the secondary battery in accordance with the level.

(3)

The control apparatus according to (2), wherein the control unit decreases the charge voltage of the secondary battery stepwise in accordance with the level in the charge setting change.

(4)

The control apparatus according to (2) or (3), wherein the control unit decreases a maximum discharge amount of the secondary battery stepwise in accordance with the level in the discharge setting change.

(5)

The control apparatus according to any one of (2) to (4), further including an acquisition unit that acquires information regarding a usage history of the secondary battery, wherein one or more of a degree of decrease in the charge voltage due to the charge setting change and a degree of decrease in the maximum discharge amount due to the discharge setting change correspond to the information.

(6)

The control apparatus according to any one of (1) to (5), wherein the secondary battery is a lithium ion secondary battery or a lithium ion polymer secondary battery.

(7)
A control method including:
a step of detecting an impact on a secondary battery or a housing to which the secondary battery is fixed; and
a step of controlling a setting related to at least one of charging and discharging of the secondary battery based on one or more of a strength of the detected impact, a direction of the impact, and a number of times of the impact.

(8)
A program for causing a computer to function as:
a detection unit that detects an impact on a secondary battery or a housing to which the secondary battery is fixed; and
a control unit that controls a setting related to at least one of charging and discharging of the secondary battery based on one or more of a strength of the detected impact, a direction of the impact, and a number of times of the impact.

REFERENCE SIGNS LIST

1 DEVICE
10 CONTROL APPARATUS
11 DETECTION UNIT
12 STORAGE UNIT
13 CONTROL UNIT
14 ACQUISITION UNIT
2 SECONDARY BATTERY
3 COVERING PORTION

The invention claimed is:

1. A control apparatus, comprising:
a sensor configured to detect an impact on one of a secondary battery or a covering portion that includes the secondary battery; and
a central processing unit (CPU) configured to:
control, based on at least one of a strength of the detected impact, a direction of the detected impact, or a number of times of the detected impact, a setting operation associated with at least one of a charge of the secondary battery or a discharge of the secondary battery;
compare a threshold and a value corresponding to the at least one of the strength of the detected impact, the direction of the detected impact, or the number of times of the detected impact;
determine, based on a comparison result of the comparison, a level for the control of the setting operation; and
perform, based on the determined level, at least one of a charge setting change to decrease a charge voltage of the secondary battery or a discharge setting change to stepwise decrease a maximum discharge amount of the secondary battery.

2. The control apparatus according to claim 1, wherein the CPU is further configured to perform the charge setting change to stepwise decrease the charge voltage of the secondary battery.

3. The control apparatus according to claim 1, further comprising a counter configured to acquire information associated with a usage history of the secondary battery, wherein at least one of a degree of the decreased charge voltage corresponds to the acquired information or degree of the decreased maximum discharge amount corresponds to the acquired information.

4. The control apparatus according to claim 1, wherein the secondary battery is one of a lithium ion secondary battery or a lithium ion polymer secondary battery.

5. A control method, comprising:
detecting an impact on one of a secondary battery or a covering portion that includes the secondary battery;
controlling, based on at least one of a strength of the detected impact, a direction of the detected impact, or a number of times of the detected impact, a setting operation associated with at least one of a charge of the secondary battery or a discharge of the secondary battery;
comparing a threshold and a value corresponding to the at least one of the strength of the detected impact, the direction of the detected impact, or the number of times of the detected impact;
determining, based on a comparison result of the comparison, a level for the control of the setting operation; and
performing, based on the determined level, at least one of a charge setting change to decrease a charge voltage of the secondary battery or a discharge setting change to stepwise decrease a maximum discharge amount of the secondary battery.

6. A non-transitory computer-readable medium having stored thereon, computer-executable instructions which, when executed by a processor, cause the processor to execute operations, the operations comprising:
in a control apparatus that includes a sensor and a central processing unit (CPU):
detecting, by the sensor, an impact on one of a secondary battery or a covering portion that includes the secondary battery;
controlling, by the CPU, based on at least one of a strength of the detected impact, a direction of the detected impact, or a number of times of the detected impact, a setting operation associated with at least one of a charge of the secondary battery or a discharge of the secondary battery;
comparing, by the CPU, a threshold and a value corresponding to the at least one of the strength of the detected impact, the direction of the detected impact, or the number of times of the detected impact;
determining, by the CPU, based on a comparison result of the comparison, a level for the control of the setting operation; and
performing, by the CPU, based on the determined level, at least one of a charge setting change to decrease a charge voltage of the secondary battery or a discharge setting change to stepwise decrease a maximum discharge amount of the secondary battery.

* * * * *